United States Patent
Foster et al.

(10) Patent No.: US 12,468,306 B2
(45) Date of Patent: Nov. 11, 2025

(54) DETECTION AND MAPPING OF GENERALIZED RETROREFLECTIVE SURFACES

(71) Applicant: TORC Robotics, Inc., Blacksburg, VA (US)

(72) Inventors: Wade Foster, Blacksburg, VA (US); Ryan Chilton, Blacksburg, VA (US); Karan Vivek Bhargava, Blacksburg, VA (US); Gowtham Raj Gunaseela Udayakumar, Blacksburg, VA (US); Harish Pullagurla, Blacksburg, VA (US); Jason Harper, Blacksburg, VA (US); Zachary Miller, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 192 days.

(21) Appl. No.: 18/222,387

(22) Filed: Jul. 14, 2023

(65) Prior Publication Data

US 2025/0021099 A1    Jan. 16, 2025

(51) Int. Cl.
*G05D 1/00* (2024.01)
*H04W 4/02* (2018.01)
*H04W 4/029* (2018.01)

(52) U.S. Cl.
CPC .......... *G05D 1/027* (2013.01); *H04W 4/027* (2013.01); *H04W 4/029* (2018.02)

(58) Field of Classification Search
CPC ....... G05D 1/027; H04W 4/027; H04W 4/029
See application file for complete search history.

(56) References Cited

U.S. PATENT DOCUMENTS 9,076,045 B2 * 7/2015 Atsmon ................ B60W 40/09
2024/0104909 A1 * 3/2024 Murrish ................. G01C 21/16

OTHER PUBLICATIONS

"CES 2021: Under the Hood with Professor Amnon Shashua" video available at https://www.youtube.com/watch?v=B7YNj66GxRA, posted Jan. 12, 2021.
Hausler et al., "P1-021: Map creation, monitoring and maintenance of automated driving—Literature Review," Department of Transport and Main Roads (Dec. 11, 2020), pp. 1-103.

* cited by examiner

*Primary Examiner* — Kito R Robinson
*Assistant Examiner* — Tanya C Sienko
(74) *Attorney, Agent, or Firm* — Armstrong Teasdale LLP

(57) ABSTRACT

A method comprises monitoring, by a processor, using a sensor of a first vehicle, data associated with a retroreflective feature near a road being driven by the first vehicle; vectorizing, by the processor, the data associated with the retroreflective feature; generating, by the processor, a digital map including vectorized data associated with the retroreflective feature and a location associated with the retroreflective feature; receiving, by the processor, data associated with the retroreflective feature from a second vehicle; and executing, by the processor, a localization protocol to identify a location of the second vehicle using the digital map.

20 Claims, 14 Drawing Sheets

Rigid Body Modeling

```
struct LandmarkFix
{
    size_t id = ++landmark_fix_runtime_serial_no;  ///< unique ID for this landmark
    Cuboid body;                                    ///< cuboid approximation
    temporal_buf_t<tf2::Vector3> points;            ///< constituent LIDAR returns // TODO get rid of this
    ros::Time first_observation;                    ///< earliest time this landmark was observed
    ros::Time last_observation;                     ///< latest time this landmark was observed
    boost::optional<uint64_t> osm_id;               ///< the corresponding OSM feature, if any
    double confidence = 0;                          ///< likelihood of corresponding to ground truth, [0, 1]
};

struct Cuboid
{
    Vector3 center;              // center of landmark
    Quaternion orientation;      // orientation relative to parent frame
    Vector3 extent;              // length, width, height in principal axes
};
```

DETECTION AND MAPPING OF GENERALIZED RETROREFLECTIVE SURFACES

TECHNICAL FIELD

The present disclosure relates generally to autonomous vehicles and, more specifically, to systems and methods for generating high definition maps.

BACKGROUND

The use of autonomous vehicles has become increasingly prevalent in recent years, with the potential for numerous benefits, such as improved safety, reduced traffic congestion, and increased mobility for people with disabilities. One of the key challenges in the development of autonomous vehicles is the ability to accurately localize the vehicle with respect to a map of the world. Inaccurate localization can lead to incorrect decision-making by the autonomous vehicle.

However, accurate localization is a challenging task, particularly in urban environments where there may be multiple sources of interference. Furthermore, current localization methods are often expensive and require significant computational resources.

SUMMARY

The methods and systems of the present disclosure may solve the problems set forth above and/or other problems in the art. Using the methods and systems discussed herein, a processor (e.g., a processor of an autonomous vehicle) may localize itself against a world map. Some conventional systems use raster maps as their source of mapping information. However, raster maps are dense, two-dimensional maps in the form of geo-rectified raster images, which is not conducive to efficient localization. Using the methods and systems discussed herein, 3D and/or vector/semantic format of map data (rather than raster) or can be added to map data as an additional layer. The methods and systems discussed herein allow the map data to be updated periodically, which is highly desirable because the methods and systems discussed herein require low manual maintenance.

Using the methods and systems discussed herein, a processor can monitor data associated with retroreflective surface (e.g., billboards, roadway signage, and/or surface reflectors). This data can be vectorized and analyzed, such that the processor can extract additional information layers from its surroundings.

In an embodiment, a method comprises monitoring, by a processor, using a sensor of a first vehicle, data associated with a retroreflective feature near a road being driven by the first vehicle; vectorizing, by the processor, the data associated with the retroreflective feature; generating, by the processor, a digital map including vectorized data associated with the retroreflective feature and a location associated with the retroreflective feature; receiving, by the processor, data associated with the retroreflective feature from a second vehicle; and executing, by the processor, a localization protocol to identify a location of the second vehicle using the digital map.

In another embodiment, a non-transitory machine-readable storage medium has computer-executable instructions stored thereon that, when executed by one or more processors, cause the one or more processors to perform operations comprising monitoring using a sensor of a first vehicle, data associated with a retroreflective feature near a road being driven by the first vehicle; vectorizing the data associated with the retroreflective feature; generating a digital map including vectorized data associated with the retroreflective feature and a location associated with the retroreflective feature; receiving data associated with the retroreflective feature from a second vehicle; and executing, by the processor, a localization protocol to identify a location of the second vehicle using the digital map.

In another embodiment, a system comprises a processor that is configured to monitor using a sensor of a first vehicle, data associated with a retroreflective feature near a road being driven by the first vehicle; vectorize the data associated with the retroreflective feature; generate a digital map including vectorized data associated with the retroreflective feature and a location associated with the retroreflective feature; receive data associated with the retroreflective feature from a second vehicle; and execute a localization protocol to identify a location of the second vehicle using the digital map.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 5A-5D show how data received from an autonomous vehicle's sensors can be analyzed, according to an embodiment.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
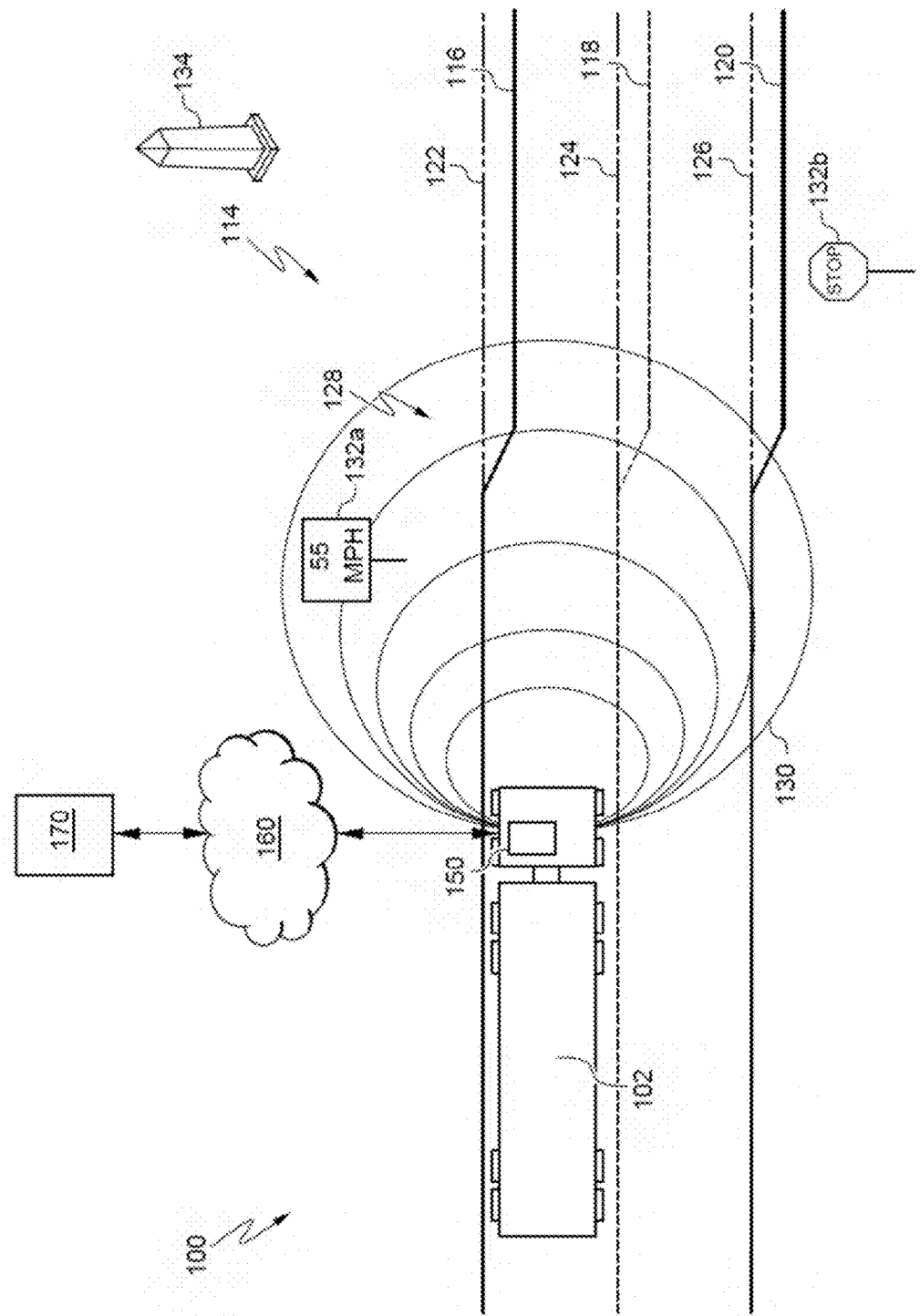
FIG. 1 is a bird's-eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. The present disclosure sometimes refers to autonomous vehicles as ego vehicles. The autonomy system 150 may be structured on at least three aspects of technology: (1) perception, (2) maps/localization, and (3) behaviors planning and control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, etc.) and features of the roadway (e.g., lane lines) around truck 102, and classify the objects in the road distinctly.

The maps/localization aspect of the autonomy system 150 may be configured to determine where on a pre-established digital map the truck 102 is currently located. One way to do this is to sense the environment surrounding the truck 102 and to correlate features of the sensed environment with details (e.g., digital representations of the features of the sensed environment) on the digital map.

Once the systems on the truck 102 have determined its location with respect to the digital map features (e.g., location on the roadway, upcoming intersections, road signs, etc.), the truck 102 can plan and execute maneuvers and/or routes with respect to the features of the digital map. The behaviors, planning, and control aspects of the autonomy system 150 may be configured to make decisions about how the truck 102 should move through the environment to get to its goal or destination. It may consume information from the perception and maps/localization modules to know where it is relative to the surrounding environment and what other objects and traffic actors are doing.

FIG. 1 further illustrates a system 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous having varying degrees of autonomy or autonomous functionality.

Figure 2:
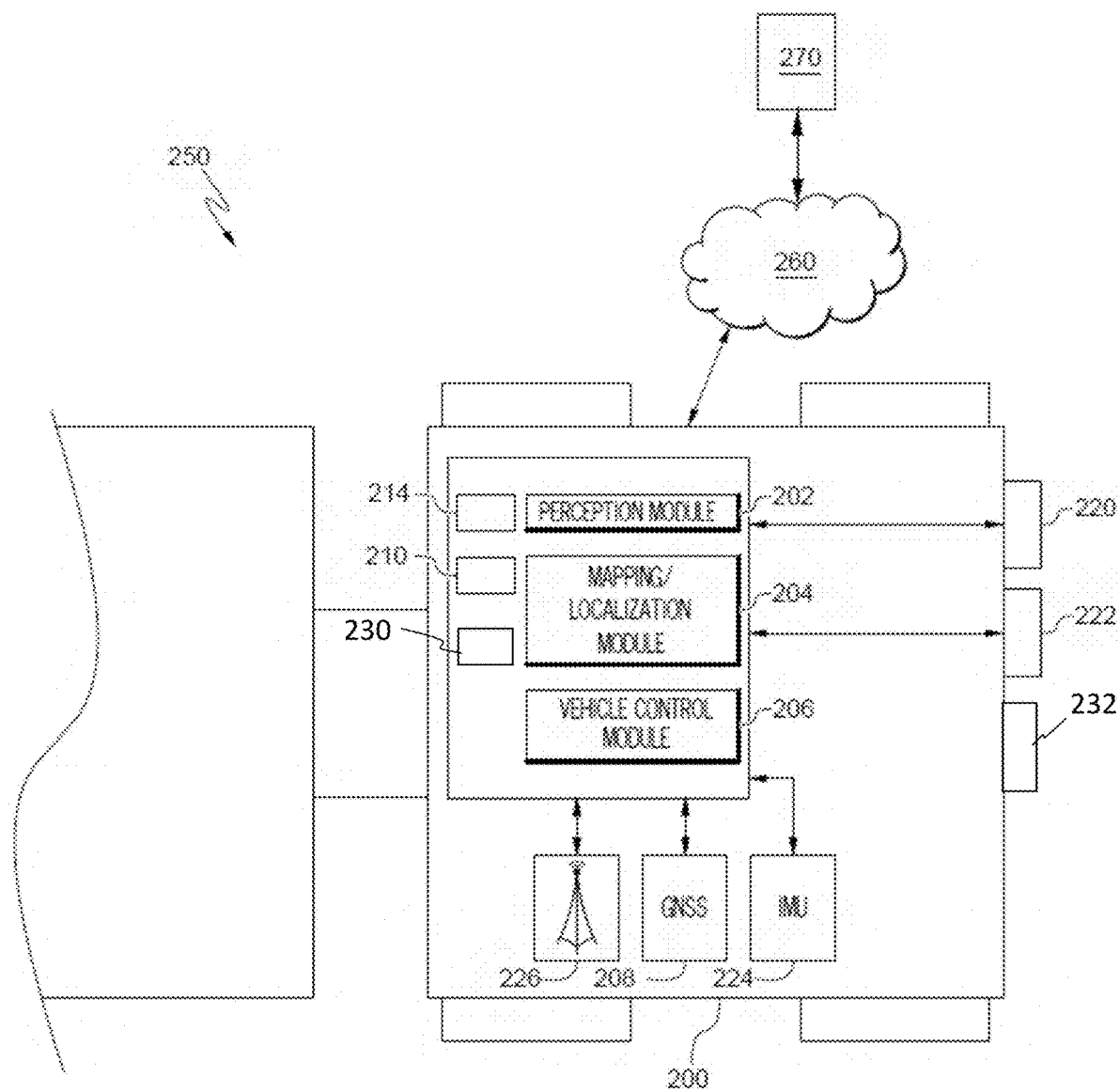
FIG. 2 is a schematic of the autonomy system of the vehicle, according to an embodiment.

With reference to FIG. 2, an autonomy system 250 may include a perception system including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As show in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field-of-view (FOV). The FOV can have any angle or aspect such that images of the areas ahead of, to the side, and behind the truck 102 may be captured. In some embodiments, the FOV may be limited to particular areas around the truck 102 (e.g., forward of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive a LiDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared (IR) light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model (s) through, for example, surface reconstruction. Collectively, the LiDAR system 222 and the camera system 220 may be referred to herein as "imaging systems."

The radar system 232 may estimate strength or effective mass of an object, as objects made out of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer, or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the truck 200 and predict a location of the truck 200, even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.). In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the autonomy system 250 to navigate or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand. In some embodiments, the truck 200 may not be in constant communication with the network 260 and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck 200. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck 200. Various other known circuits may be associated with the autonomy system 250, including signal-conditioning circuitry, communication circuitry, actuation circuitry, and other appropriate circuitry.

The memory 214 of autonomy system 250 may store data and/or software routines that may assist the autonomy system 250 in performing its functions, such as the functions of the perception module 202, the mapping/localization module 204, the vehicle control module 206, a collision analysis module 230, the model 500 described herein with respect to FIG. 5, and the method described herein with respect to FIG. 6. Further, the memory 214 may also store data received from various inputs associated with the autonomy system 250, such as data from the perception system.

As noted above, perception module 202 may receive input from the various sensors, such as camera system 220, LiDAR system 222, GNSS receiver 208, and/or IMU 224 (collectively "perception data") to sense an environment surrounding the truck 200 and interpret it. To interpret the surrounding environment, the perception module 202 (or "perception engine") may identify and classify objects or groups of objects in the environment. For example, the truck 102 may use the perception module 202 to identify one or more objects (e.g., pedestrians, vehicles, debris, etc.) or features of the roadway 114 (e.g., intersections, road signs, lane lines, etc.) before or beside a vehicle and classify the objects in the road. In some embodiments, the perception module 202 may include an image classification function and/or a computer vision function.

The system 100 may collect perception data. The perception data may represent the perceived environment surrounding the vehicle, for example, and may be collected using aspects of the perception system described herein. The perception data can come from, for example, one or more of the LiDAR system, the camera system, and various other externally-facing sensors and systems on board the vehicle (e.g., the GNSS receiver, etc.). For example, on vehicles having a sonar or radar system, the sonar and/or radar systems may collect perception data. As the truck 102 travels along the roadway 114, the system 100 may continually receive data from the various systems on the truck 102. In some embodiments, the system 100 may receive data periodically and/or continuously. With respect to FIG. 1, the truck 102 may collect perception data that indicates presence of the lane lines 116, 118, 120. Features perceived by the vehicle should generally track with one or more features stored in a digital map (e.g., in the mapping/localization module 204). Indeed, with respect to FIG. 1, the lane lines 116, 118, 120 that are detected before the truck 102 is capable of detecting the bend 128 in the road (that is, the lane lines that are detected and correlated with a known, mapped feature) will generally match with features in a stored map and the vehicle will continue to operate in a normal fashion (e.g., driving forward in the left lane of the roadway or per other local road rules). However, in the depicted scenario the vehicle approaches a new bend 128 in the road that is not stored in any of the digital maps onboard the truck 102 because the lane lines 116, 118, 120 have shifted right from their original positions 122, 124, 126.

The system 100 may compare the collected perception data with stored data. For example, the system may identify and classify various features detected in the collected perception data from the environment with the features stored in a digital map. For example, the detection systems may detect the lane lines 116, 118, 120 and may compare the detected lane lines with lane lines stored in a digital map. Additionally, the detection systems could detect the road signs 132*a*, 132*b* and the landmark 134 to compare such features with features in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.) that may control how the system 100 interacts with the various features. Based on the comparison of the detected features with the features stored in the digital map(s), the system may generate a confidence level, which may represent a confidence of the vehicle in its location with respect to the features on a digital map and hence, its actual location.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.)

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200, and may correlate features of the sensed environment with details (e.g., digital representations of the features of the sensed environment) on the one or more digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connection to an external network during the mission. A centralized mapping system may be accessible via network 260 for updating the digital map(s) of the mapping/localization module 204. The digital map may be built through repeated observations of the operating environment using the truck 200 and/or trucks or other vehicles with similar functionality. For instance, the truck 200, a specialized mapping vehicle, a standard autonomous vehicle, or another vehicle, can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it onboard and use it within its mapping/localization module 204. Hence, the truck 200 and other vehicles (e.g., a fleet of trucks similar to the truck 200) can generate, maintain (e.g., update), and use their own generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck 200. For example, once the systems on the truck 200 have determined its location with respect to map features (e.g., intersections, road signs, lane lines, etc.) the truck 200 may use the vehicle control module 206 and its associated systems to plan and execute maneuvers and/or routes with respect to the features of the environment. The vehicle control module 206 may make decisions about how the truck 200 will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck 200. The steering system may be any combination of mechanisms configured to adjust the heading or direction of the truck 200. The brake system may be, for example, any combination of mechanisms configured to decelerate the truck 200 (e.g., friction braking system, regenerative braking system, etc.) The vehicle control module 206 may be configured to avoid obstacles in the environment surrounding the truck 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

In disclosed embodiments of a system for planning paths that will minimize the severity of a collision, the system 100, 250 collects perception data on objects that satisfy predetermined criteria for likelihood of collision with the ego vehicle. Such objects are sometimes referred to herein as target objects. Collected perception data on target objects may be used in collision analysis.

In an embodiment, collision analysis module 230 executes an artificial intelligence model to predict one or more attributes of detected target objects. The artificial intelligence model may be configured to ingest data from at least one sensor of the autonomous vehicle and predict the attributes of the object. In an embodiment, the artificial intelligence module is configured to predict a plurality of predetermined attributes of each of a plurality of detected target objects relative to the autonomous vehicle. The predetermined attributes may include a relative velocity of the respective target object relative to the autonomous vehicle and an effective mass attribute of the respective target object. In an embodiment, the artificial intelligence model is a predictive machine learning model that may be continuously trained using updated data, e.g., relative velocity data, mass attribute data, and target objects classification data. In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

Figure 3:
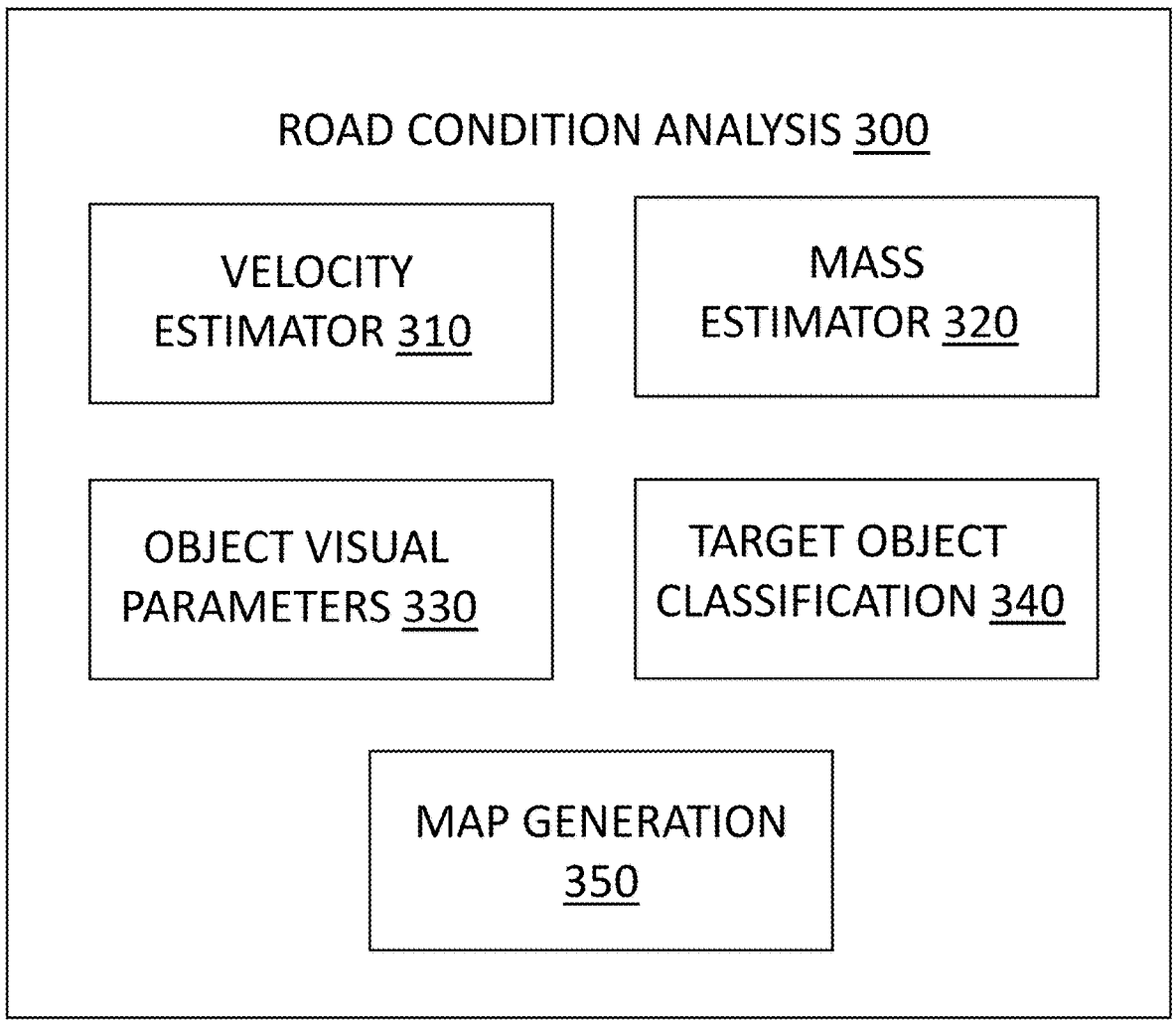
FIG. 3 is a schematic diagram of a collision analysis module of the autonomy system of the vehicle, according to an embodiment.

FIG. 3 shows a road condition analysis module 300 of system 100, 250. The road condition analysis module 300 includes velocity estimator 310, effective mass estimator 320, object visual parameters component 330, and target object classification component 340. These components of road condition analysis module 300 may be either or both software-based components and hardware-based components.

Velocity estimator 310 may determine the relative velocity of target objects relative to the ego vehicle. Effective mass estimator 320 may estimate effective mass of target objects, e.g., based on object visual parameters signals from object visual parameters component 330 and object classification signals from target object classification component 340. Object visual parameters component 330 may determine visual parameters of a target object, such as size, shape, visual cues and other visual features, in response to visual sensor signals and generate an object visual parameters signal. Target object classification component 340 may determine a classification of a target object using information contained within the object visual parameters signal, which may be correlated to various objects, and generates an object classification signal. For instance, the target object classification component 340 can determine whether the target object is a plastic traffic cone or an animal.

Target objects may include moving objects such as other vehicles, pedestrians, and cyclists in the proximal driving area. Target objects may include fixed objects such as obstacles; infrastructure objects such as rigid poles, guardrails or other traffic barriers; and parked cars. Fixed objects, also herein referred to herein as static objects and non-moving objects, can be infrastructure objects as well as temporarily static objects such as parked cars. Systems and methods herein may aim to choose a collision path that may involve a surrounding inanimate object. The systems and methods aim to avoid a vulnerable pedestrian, bicyclist, motorcycle, or other targets involving people or animate beings, and this avoidance is a priority over a collision with an inanimate object.

Externally-facing sensors may provide system 150, 250 with data defining distances between the ego vehicle and target objects in the vicinity of the ego vehicle, and with data defining direction of target objects from the ego vehicle. Such distances can be defined as distances from sensors, or sensors can process the data to generate distances from the center of mass or other portion of the ego vehicle.

In an embodiment, the system 150, 250 collects data on target objects within a predetermined region of interest (ROI) in proximity to the ego vehicle. Objects within the ROI satisfy predetermined criteria for likelihood of collision with the ego vehicle. The ROI is alternatively referred to herein as a region of collision proximity to the ego vehicle. The ROI may be defined with reference to parameters of the vehicle control module 206 in planning and executing maneuvers and/or routes with respect to the features of the environment. In an embodiment, there may be more than one ROI in different states of the system 150, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

Using the data collected, a map generation module 350 may generate a digital map (e.g., high-definition (HD) map) used by the autonomous vehicle to navigate. The map generation module 350 may generate a digital map by utilizing various data sources and advanced algorithms. The data sources may include information from onboard sensors, such as cameras, LiDAR, and radar, as well as data from external sources, such as satellite imagery and information from other vehicles. The map generation module 350 may collect and process the data from these various sources to create a high-precision representation of the road network. The map generation module 350 may also apply advanced algorithms to the data, such as machine learning and probabilistic methods, to improve the detail of the road network map. The algorithms may identify location and shape of the retroreflective features. The resulting map may then be stored in a format that can be easily accessed and used by the autonomous vehicle. The stored map can be used by autonomous vehicles to localize themselves.

Figure 4:
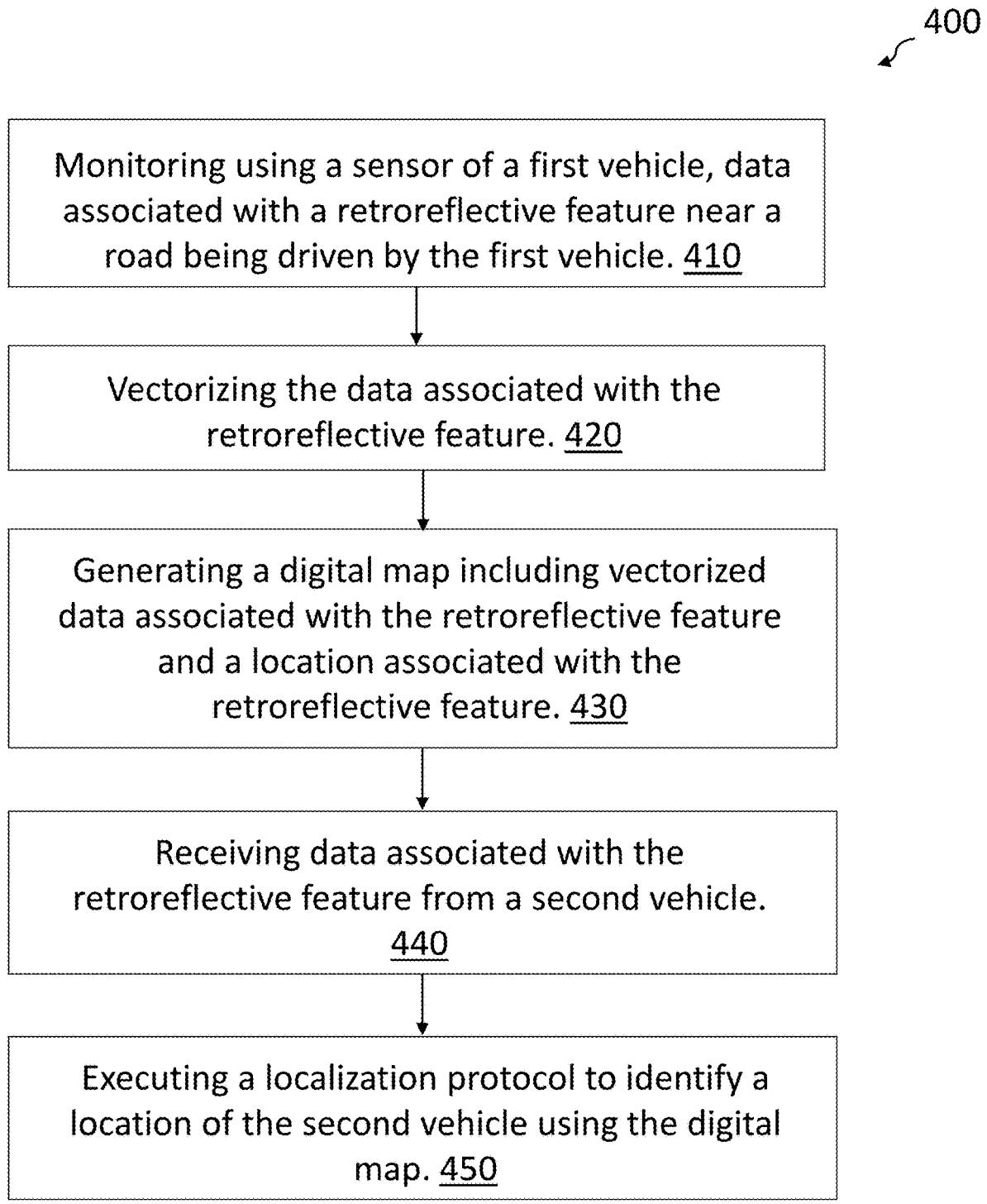
FIG. 4 is a method of localizing an autonomous vehicle using retroreflective features, according to an embodiment.

FIG. 4 shows execution steps of a processor-based method using the system 100, 250, and 300 according to some embodiments. The method 400 shown in FIG. 4 comprises execution steps 410-450. However, it should be appreciated that other embodiments may comprise additional or alternative execution steps or may omit one or more steps altogether. It should also be appreciated that other embodiments may perform certain execution steps in a different order. Steps discussed herein may also be performed simultaneously or near-simultaneously.

FIG. 4 is described as being performed by a processor, such as the processor 210 depicted in FIG. 2. However, in some embodiments, one or more of the steps may be performed by a different processor, server, or any other computing feature. For instance, one or more of the steps may be performed via a cloud-based service or another processor in communication with the processor of the autonomous vehicle and/or its autonomy system. Although the steps are shown in FIG. 4 having a particular order, it is intended that the steps may be performed in any order. It is also intended that some of these steps may be optional.

Using the method 400, a processor (e.g., a central server in communication with multiple autonomous vehicles) can generate a map that includes location data associated with different retroreflective surfaces and their shapes. The processor may then use the map to localize an autonomous vehicle on the road. That is, the processor may identify a retroreflective surface using sensor data and then determine an exact location of the autonomous vehicle.

At step 410, the processor may monitor, using a sensor of a first vehicle, data associated with a retroreflective feature near a road being driven by the first vehicle. The processor may include various sensors discussed herein that monitor data associated with the road being driven by the autonomous vehicle, such as road signs, road attributes, and retroreflective surfaces, such as billboard and other surfaces near the road. The monitoring/detection can be conducted using various data points received from one or more of sensors of the autonomous vehicle (e.g., LiDAR point clouds). As used herein, LiDAR point clouds may refer to a collection of 3D points generated by a LiDAR sensor. The LiDAR sensor of the autonomous vehicle may continuously monitor and collect 3D points indicating items near the autonomous vehicle.

At step 420, the processor may vectorize the data associated with the retroreflective feature. The processor may generate vectors for the data points received from the sensors of the autonomous vehicle. As discussed herein, the processor may process the data points received, such that retroreflective features are identified and stored in a manner that can be analyzed.

In some embodiments, the processor may pre-process the data points for more efficient processing. For instance, the processor may filter the data points received before the data points are analyzed. In some embodiments, the processor may apply a threshold to the data points in accordance with the strength of their return values (as received via the LiDAR), where sufficient intensity/reflectivity indicates a retroreflective surface. The processor may then, over time, accumulate the data points into an inertial frame of reference. The processor may then cluster the data points associated with the inertial frame of reference together using various methods, such as a density-based spatial clustering of applications with noise (DBSCAN). Using various methods, the processor may then determine clusters of high-intensity LiDAR return values. As a result, the processor may use the clustered data points to generate 3D-oriented cuboids, which can be drawn around each cluster using various methods, such as principal component analysis (PCA).

Referring now to FIGS. 5-6, non-limiting examples of analyzing data received from a LiDAR are presented. In some embodiments, when producing mappable features, the processor may take into account the repeatability of observations. This may result in features, which are geometrically stable, yet temporally spurious, being classified as map elements. Among other things, the processor may also account for the number, consistency, and age of observations when producing mapped features. The processor may develop a framework for quantifying the repeatability and reliability of a landmark, and create a subsequent decision boundary, which may enable the processor to accept some mapped features and reject others.

The processor may determine (for each data point or a cluster of data points) a confidence value or a landmark confidence value. In some embodiments, the landmark confidence value may be expressed as the true probability of detection, given the opportunity for detection. This value may be related, but not identical, to the probability that the feature truly exists in the real world. The processor may use the following formula to calculate a landmark confidence value:

$$p_{detection} = \frac{\text{number of detections of feature } X}{\text{opportunities for detection of feature } X}$$

For a single observation of some hypothetical feature X, the probability that the observation is a true positive may be taken as a given value of f(x), which is referred to as the kernel function:

$$\text{kernel} := f(x) \quad \overline{f}(x) = 1 - f(x)$$

The complement of this function may represent the probability that the observed feature does not exist (in the mappable sense). This function may vary with the parameter x, which represents the time before or after the detection. For instance, as x tends to infinity, a well-behaved kernel will approach or equal zero, reflecting the fact that observations far in the past contribute little to the knowledge of the present state of the world. Likewise, the probability of two observations both being true positives is:

$$g(t) \times f(t)$$

The probability that both observations are false positives (that is, neither of them is a true positive) may be calculated using:

$$\overline{g}(t) \times \overline{f}(t) = (1 - f(t)) \times (1 - g(t))$$

And the probability that at least one of them is a true positive may be:

$$1 - \overline{f}(t) \times \overline{g}(t)$$

In general, the probability that at least 1 in N observations is a true positive (which is taken as an estimate for the true probability of the existence of some feature X), may be calculated using:

$$\hat{p}_{exist} = 1 - \sum_{i=1}^{N} \overline{f_i}(x)$$

Thereby, the same landmark confidence value may be calculated using the following:

$$p_{detection} = \frac{\text{total duration of detection of feature } X}{\text{total duration within a region of interest surrounding feature } X}$$

Landmark Representation

The processor may extract landmark information in the form of rectangular rigid bodies, which may be fitted to clusters of retroreflective returns. Landmarks may be represented as a cuboid structure with metadata detailing a unique identifier, the constituent points, earliest and latest observation times, corresponding Open Street Map (OSM) features, confidence values, and the like. The orientation of a landmark's cuboid body may be determined using a singular value decomposition of the constituent points, in order to use its principal axes as basis vectors. Accordingly, the orientation may be determined on an orthonormal basis where the X-axis is along the dimension of greatest variance, and the Z-axis is along the dimension of least variance. Representing the constituent points of a landmark on this new basis, the extent in any given dimension may be the distance between the most negative and most positive point along that principal axis.

Figure 5B:
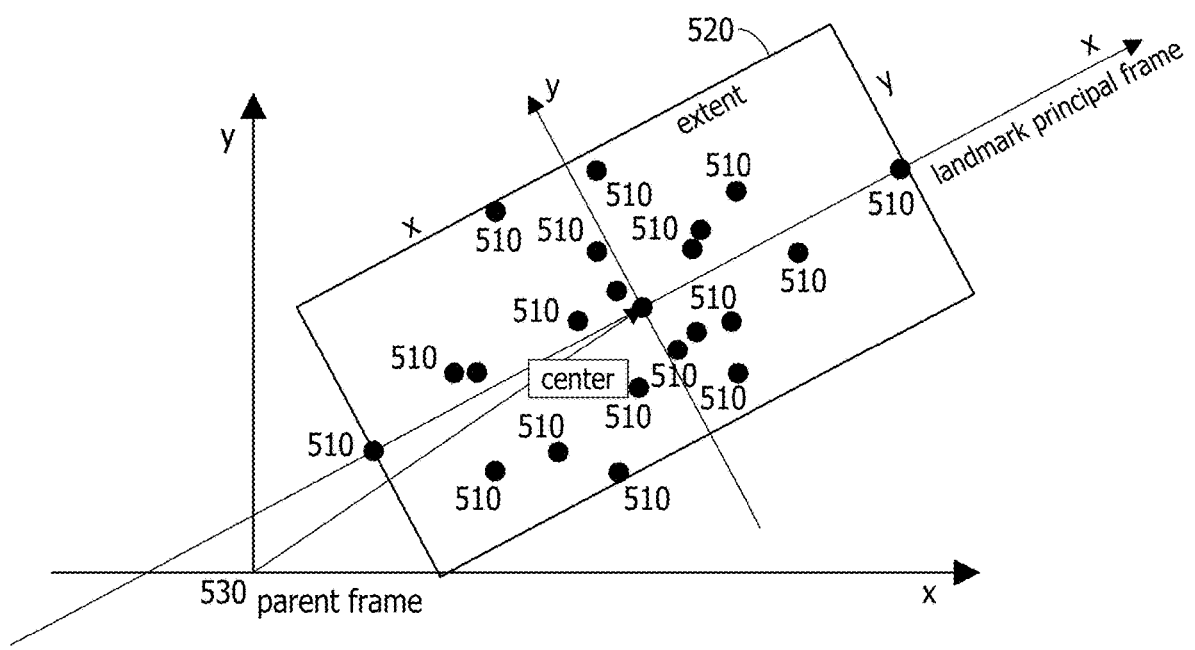
Figure 5C:
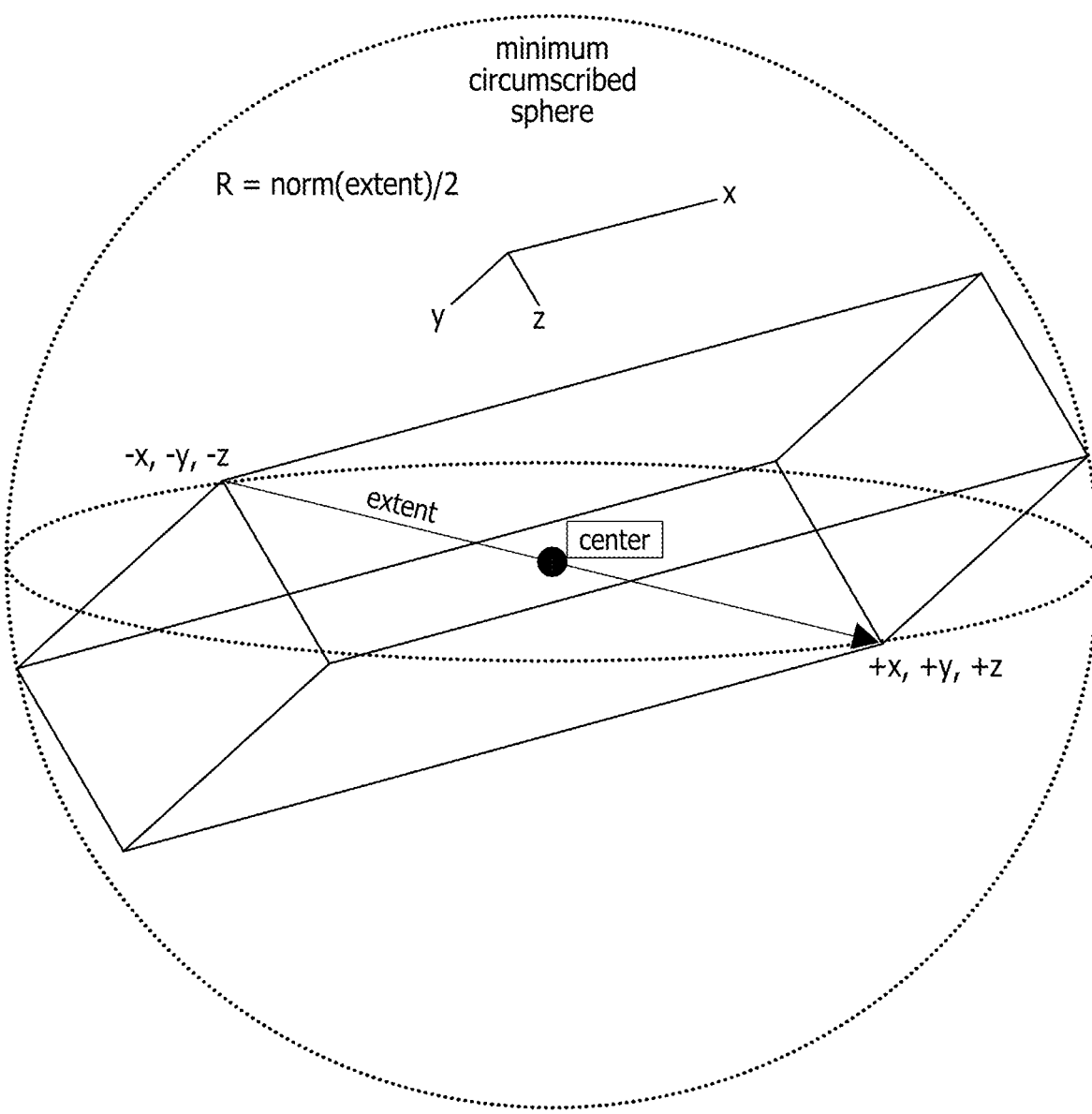

The processor may use various computer modeling techniques to generate the cuboid, as depicted in FIG. 5A. For instance, the processor may use the rigid body model 500 to vectorize data points received from a LiDAR sensor of an autonomous vehicle. Referring now to FIG. 5B, data points 510 may represent the data points received from the LiDAR sensor. The processor may process/analyze these data points 510 using the computer model 500. As a result, the processor may identify coordinates of the extent (box 520), center of the box 520, parent frame 530, and landmark principle frame, as depicted. The processor may then apply the same methods to generate a cuboid in multiple dimensions, as depicted in FIG. 5C.

Figure 5D:
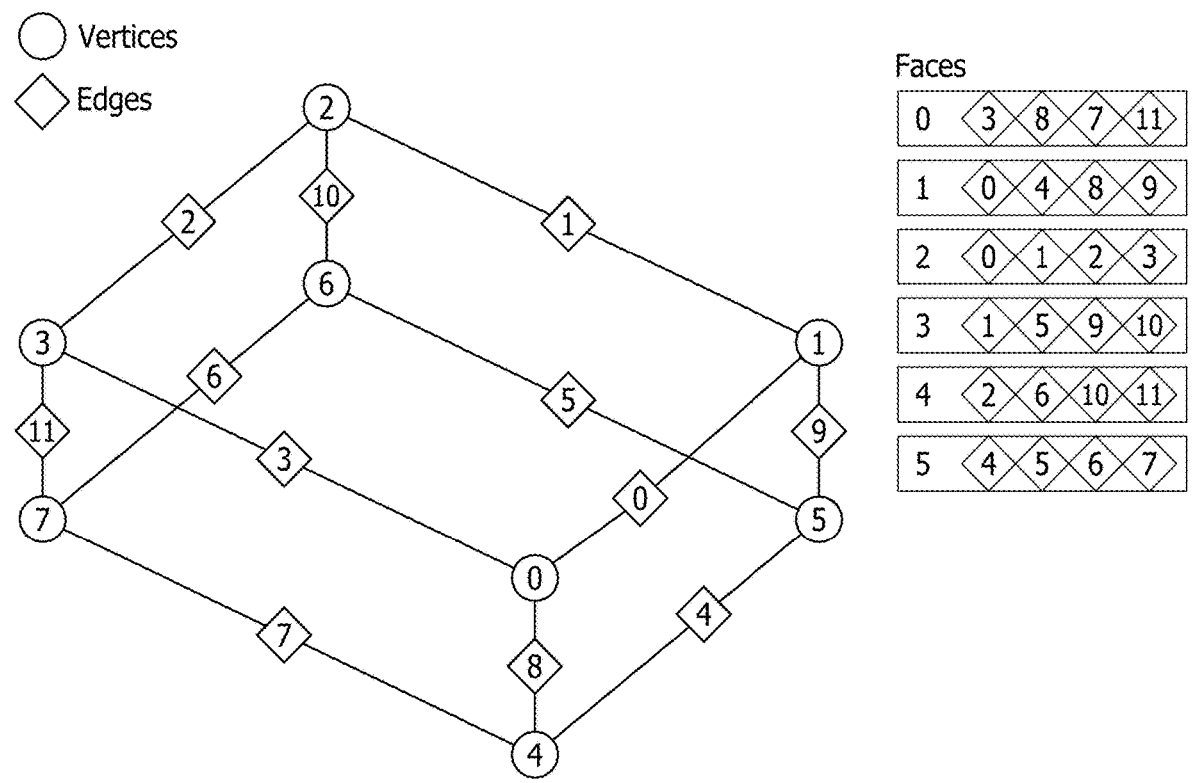

Using computer modeling, the processor may identify the edges, faces, and vertices of an object (represented by the data points received from the sensor), as depicted in FIG. 5D. In some embodiments, the center may not represent the centroid of all constituent points. Instead, it may represent the geometric center of the fitted rectangular prism.

Cuboid Consensus Procedure

Given a group of associated observation cuboids (e.g., cuboids 600 depicted in FIGS. 6A-6I, which are represented in 2D), the processor may fuse the observations together into a single "ground truth" mapped landmark, which represents an expected/predicted shape of the observations. The processor may use various methods to identify a "consensus" cuboid given a group of cuboids.

Figure 6A:
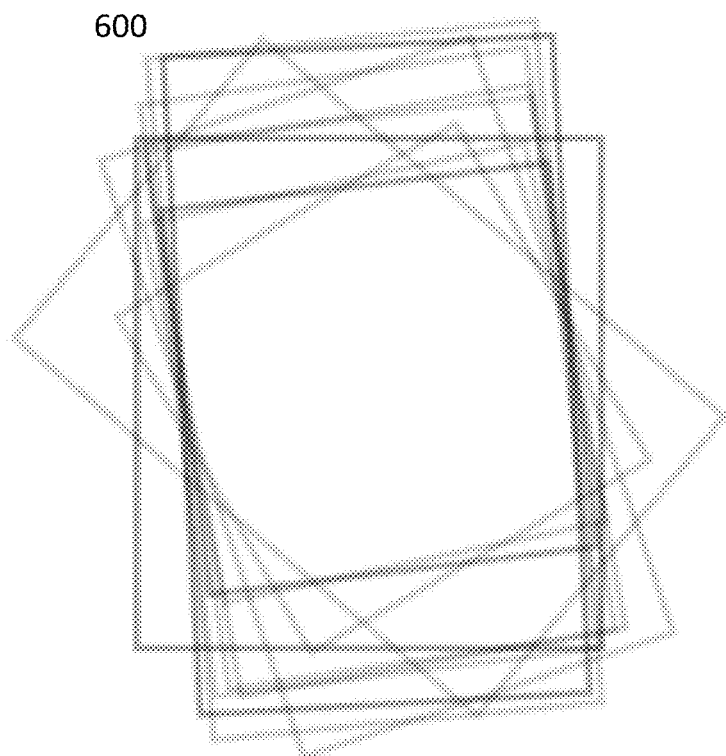
FIGS. 6A-6I show how data received from an autonomous vehicle's sensors can be analyzed, according to an embodiment.
Figure 6B:
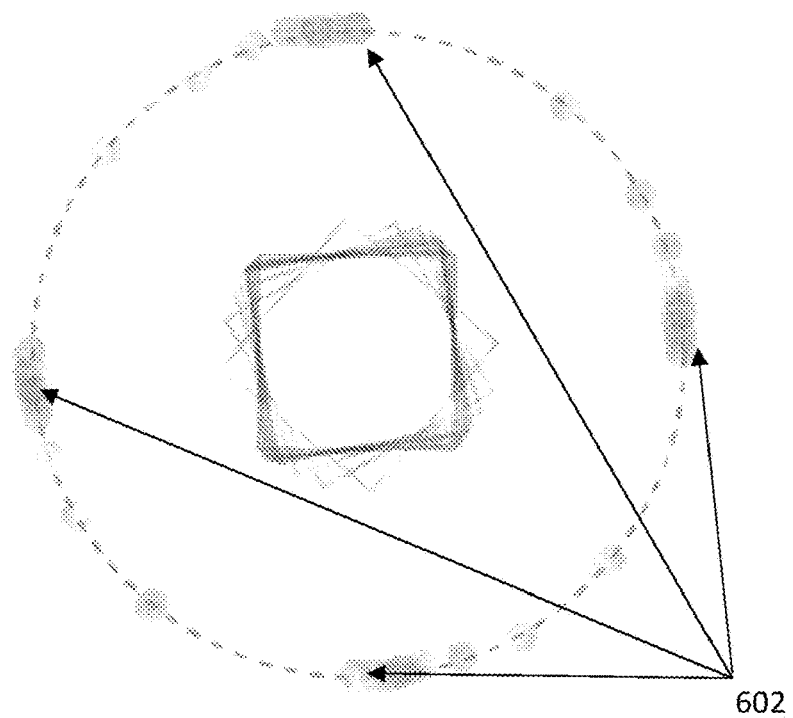

As depicted in FIG. 6B, when computing the consensus orientation, the processor may disregard the size and position of each cuboid. For instance, the processor may (at least initially) assume that the sizes and center positions of the cuboids are the same. As depicted, the tips of each principal axis of each cuboid on the unit sphere (or unit circle in the depicted diagrams) may be drawn. In high-agreement observation groups, these points on the unit sphere may coalesce around six poles (four poles in two dimensions, as depicted in the areas 602). These areas may represent the naturally expected solutions to the orientation problem. However, this method may still converge where there are no obvious solutions, like the depicted embodiment, e.g., in some cases, as in planar features, two polar clusters are obvious, with a ring of points orthogonal to the normal axis, indicating strong agreement in the direction of the planar normal and weak agreement in the other principal axes.

Figure 6C:
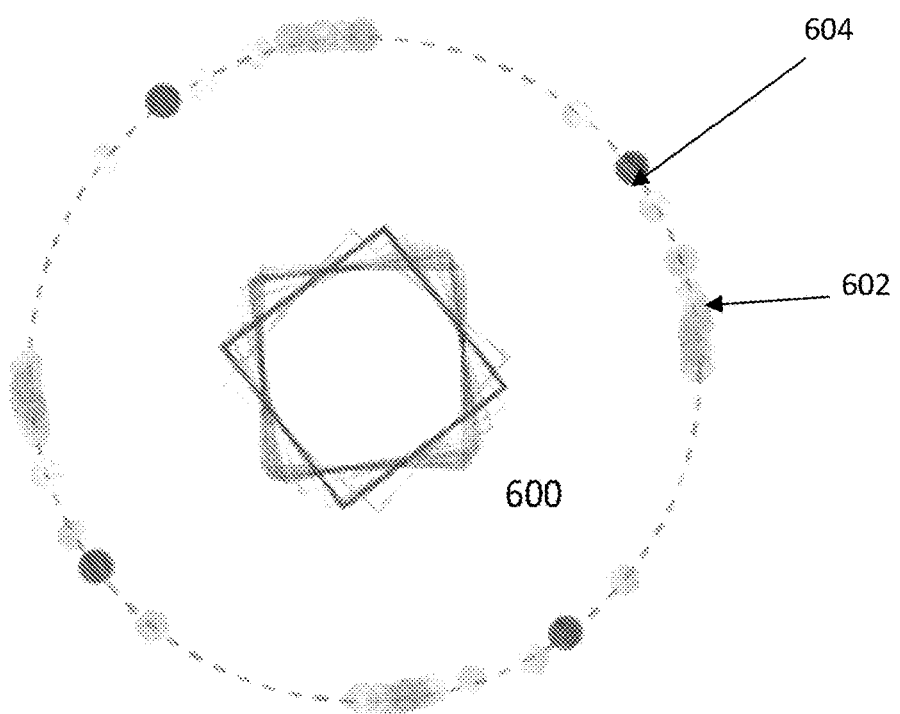

As depicted in FIG. 6C, the processor may initialize the iteration with an arbitrary (random, or unit) orientation. As depicted, the unit sphere points of this initial estimation may not lie exactly on the six poles. For instance, the initial estimation point 604 does not align with the area 602.

Figure 6D:
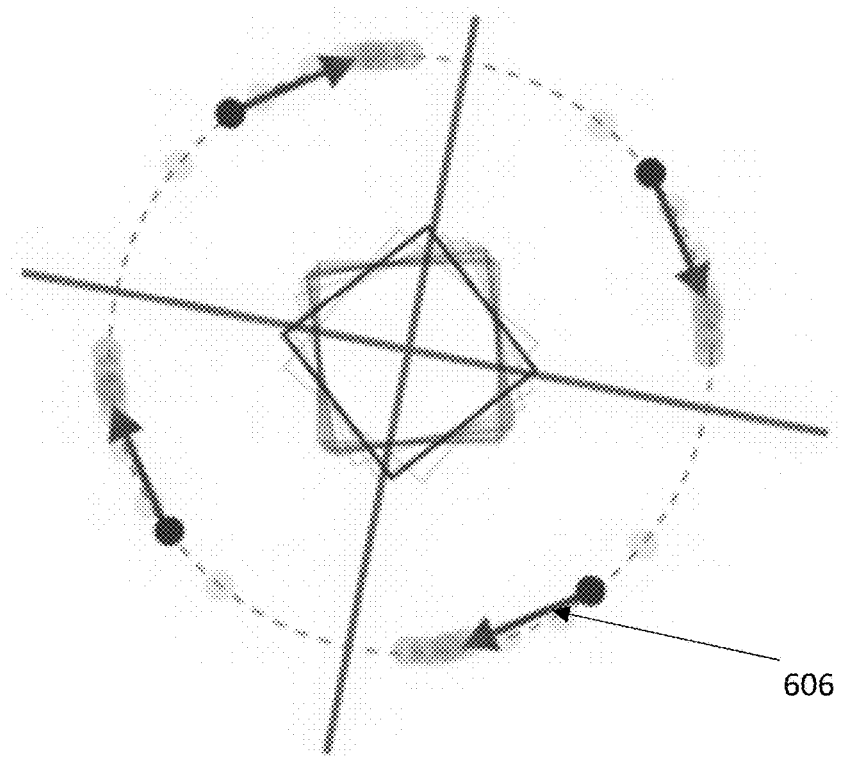
Figure 6E:
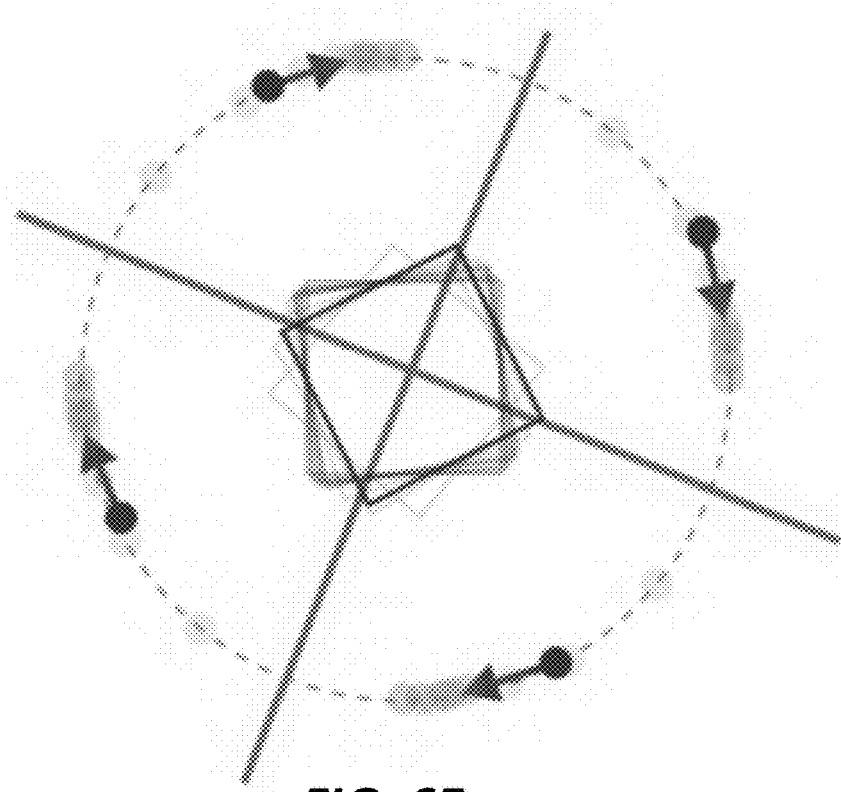

As depicted in FIGS. 6D-E, for each of the observation points, the processor may determine a nearest estimation point and compute the vector between them, such as the vector 606. The processor may add/sum these vectors over all the data points and divide by the number of data points. That is, as depicted, the processor may iteratively repeat the process. As depicted, the vectors tend to get smaller after multiple iterations. The resultant vector, called the "correction" vector, may then be drawn. The processor may iteratively repeat this process, such that the data points align better. After several iterations, the processor may identify a consensus. Effectively, the vector "pulls" the solution towards the centroid of nearby points, with a magnitude proportional to the distance the solution must travel. Rotating the estimated orientation in this direction may tend to reduce the average distance between the observation points and the data points, as depicted in FIG. 6E.

Figure 6F:
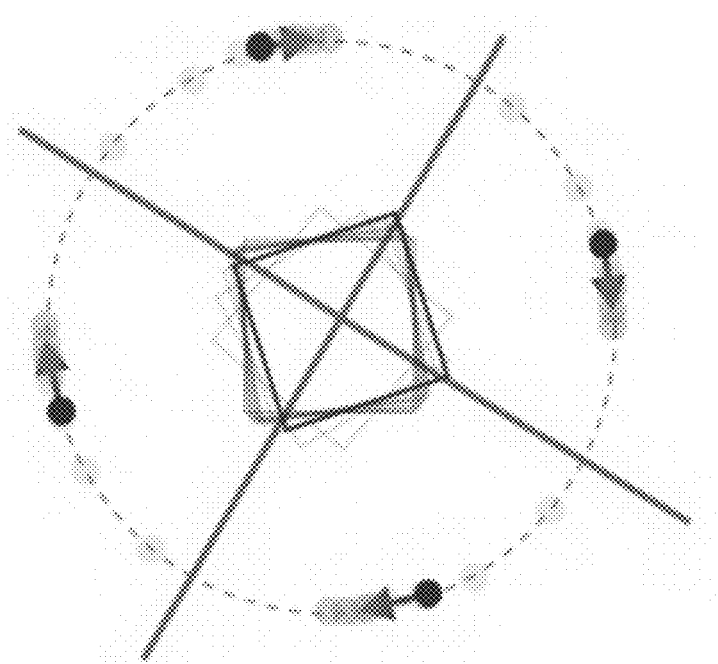
Figure 6G:
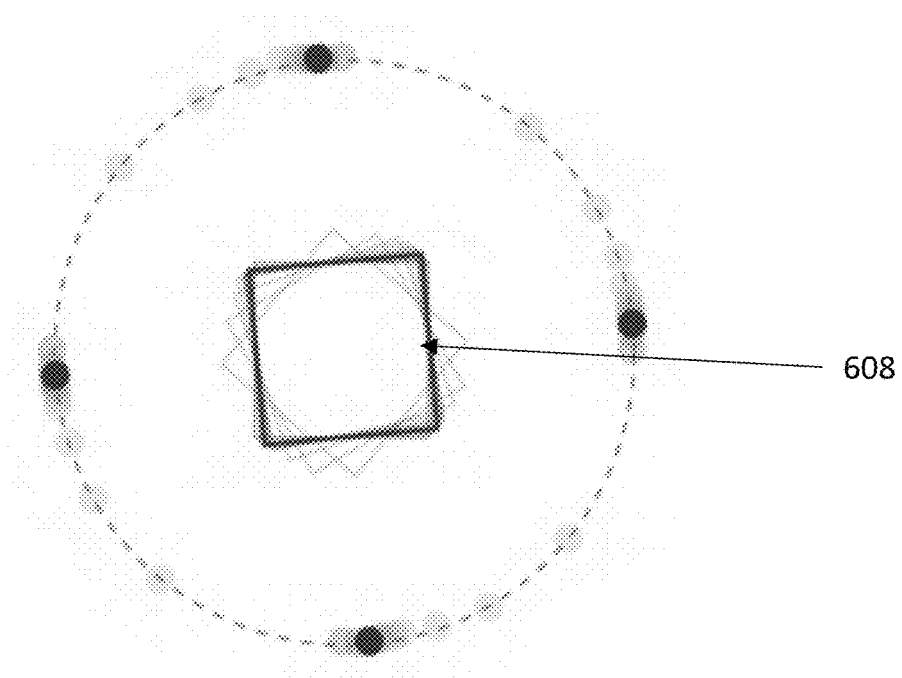

As depicted in FIG. 6F, the processor may continue the iteration until the correction vector's magnitude is sufficiently small that would result in an orientation, which approximately minimizes the distance between basis vectors across all observations. After many iterations, the processor may reach a single shape, such as the consensus 608 shown in FIG. 6G.

Once the consensus orientation of a group of observations has been determined, the size of the observations can be considered/identified. For instance, each observation's size is projected onto the basis vectors of the resultant orientation, drawn as dots on the circle. Each dot represents a scalar measurement, interpreted as "sampling" the size of a cuboid along a given test vector. For each basis vector, these scalar samples may be averaged to produce the resultant size along that basis vector. Size sampling may assume that each cuboid has the same position. Moving an observation's center relative to the other observations in a group may not affect the sampled size.

Figure 6H:
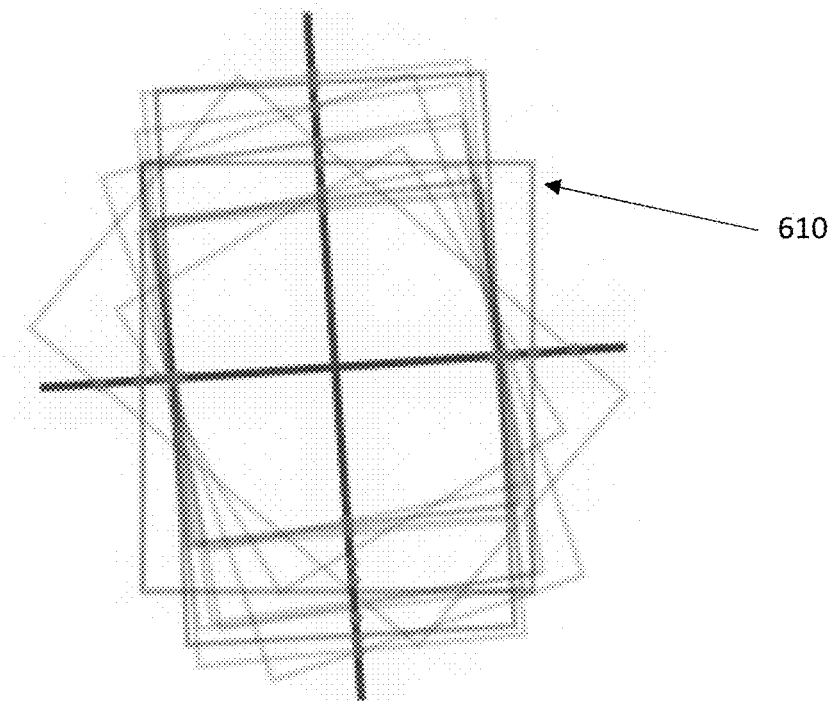
Figure 6I:
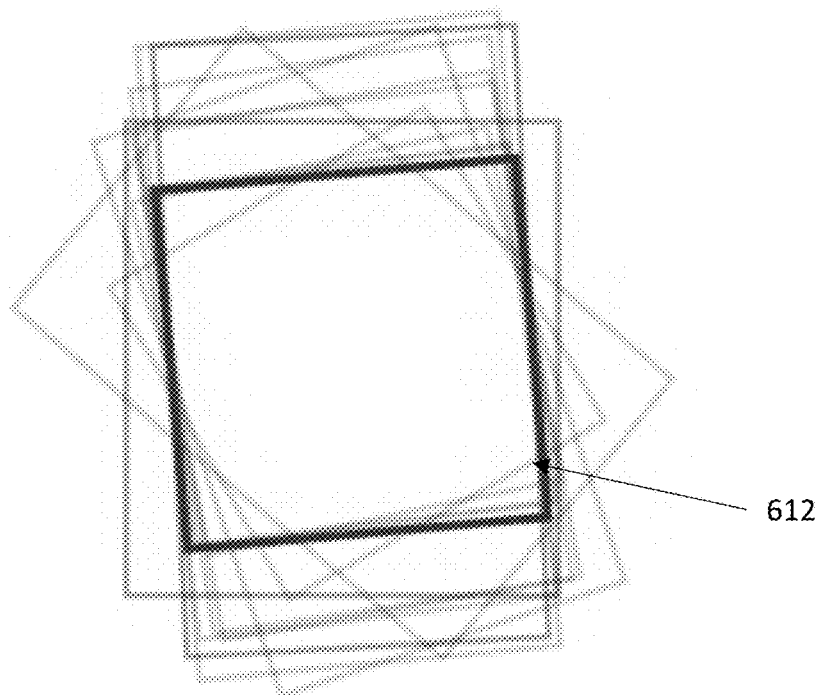

Using the methods discussed herein, as depicted in FIGS. 6H-6I, the processor may identify/generate a consensus shape among boxes/cuboids received from the sensor. For instance, the processor may receive various data points and generate boxes 610. The processor may then iteratively perform the calculations discussed herein to identify the consensus 612.

In some embodiments, the processor may augment the generated cuboids such that the processor can minimize the volume of the cuboid while still containing all of the points in the cluster. These cuboids may represent a mathematical correlation between data points that correspond to a retroreflective object and/or "landmark fixes."

Referring back to FIG. 4, at step 430, the processor may generate a digital map including vectorized data associated with the retroreflective feature and a location associated with the retroreflective feature. The processor may generate and/or update a map with the identified landmark (retroreflective feature).

The processor may generate data records within a database that represent the retroreflective feature identified. The processor may generate "observation mapping" files in which detections made by autonomous vehicles are recorded and re-expressed in a data repository as real-world objects. In some embodiments, the processor may use an Earth-Centered Earth Fixed system/frame (ECEF frame) representing the detected object. A typical autonomous vehicle can produce between $10^4$ and $10^6$ discrete observations. These observations are generally associated with each other as being likely to represent the same true feature and combined together to form a consensus cuboid object, which best represents the associated observations. These fused landmarks may then be produced as the final map, which may be embedded into the semantic map for vehicle processes to use for navigational purposes.

After generating the map, the processor may associate sensed landmark detections received from other autonomous vehicles with those in the generated map. If an associated pair is made (e.g., when the processor determines that an object detected by an autonomous vehicle matches an object within the map), the processor can use location data to associate with the object within the map to a location in the real world.

At step 440, the processor may receive data associated with the retroreflective feature from a second vehicle. The processor may be in communication with various autonomous vehicles having various sensors configured to detect the autonomous vehicles' surroundings. As a result, the processor may continuously receive data points indicating what objects surround different vehicles. As discussed herein, the processor can analyze these data points to localize different vehicles using the generated map.

At step 450, the processor may execute a localization protocol to identify the location of the second vehicle using the digital map.

After generating the map, the processor may store the map in a central data repository that is accessible to multiple vehicles. Using the map, the processor may localize multiple vehicles. The processor may execute a localization protocol that analyzes the location of the second autonomous vehicle.

The map generated may provide a position for multiple retroreflective features identified using the methods and systems discussed herein. The map may also include various attributes of the identified retroreflective features, such as shape, size, and elevation.

The processor may be in communication with a group of autonomous vehicles. Each autonomous vehicle may be configured to execute similar algorithms used for mapping, as discussed herein. As a result, each vehicle may transmit various data points to the processor. To locate an autonomous vehicle, the processor may match the received data points, representing a feature detected near a vehicle, with features within the generated map.

Using the data points, the processor may use a particle filter to simulate multiple locations for the second autonomous vehicle. The simulation may determine a distance between each simulated location of the features near the second autonomous vehicle. For each simulation, the processor may determine a score. The score may be based on how well the calculated instances and locations match with the features included in the map.

The distance may include an expected error rate when matching features within the map. This is due to the fact that small errors in receiving, transmitting, and/or analyzing sensor data may occur when multiple autonomous vehicles are involved. The processor may use a probability distribution (e.g., Gaussian distribution) around the locations of the objects in the map and aggregate errors/distances to identify a score for each calculated feature's probability of matching the location of that feature within the map. Using the individual scores, the processor may generate a final score for each candidate (simulated) location of the second autonomous vehicle.

Figure 7:
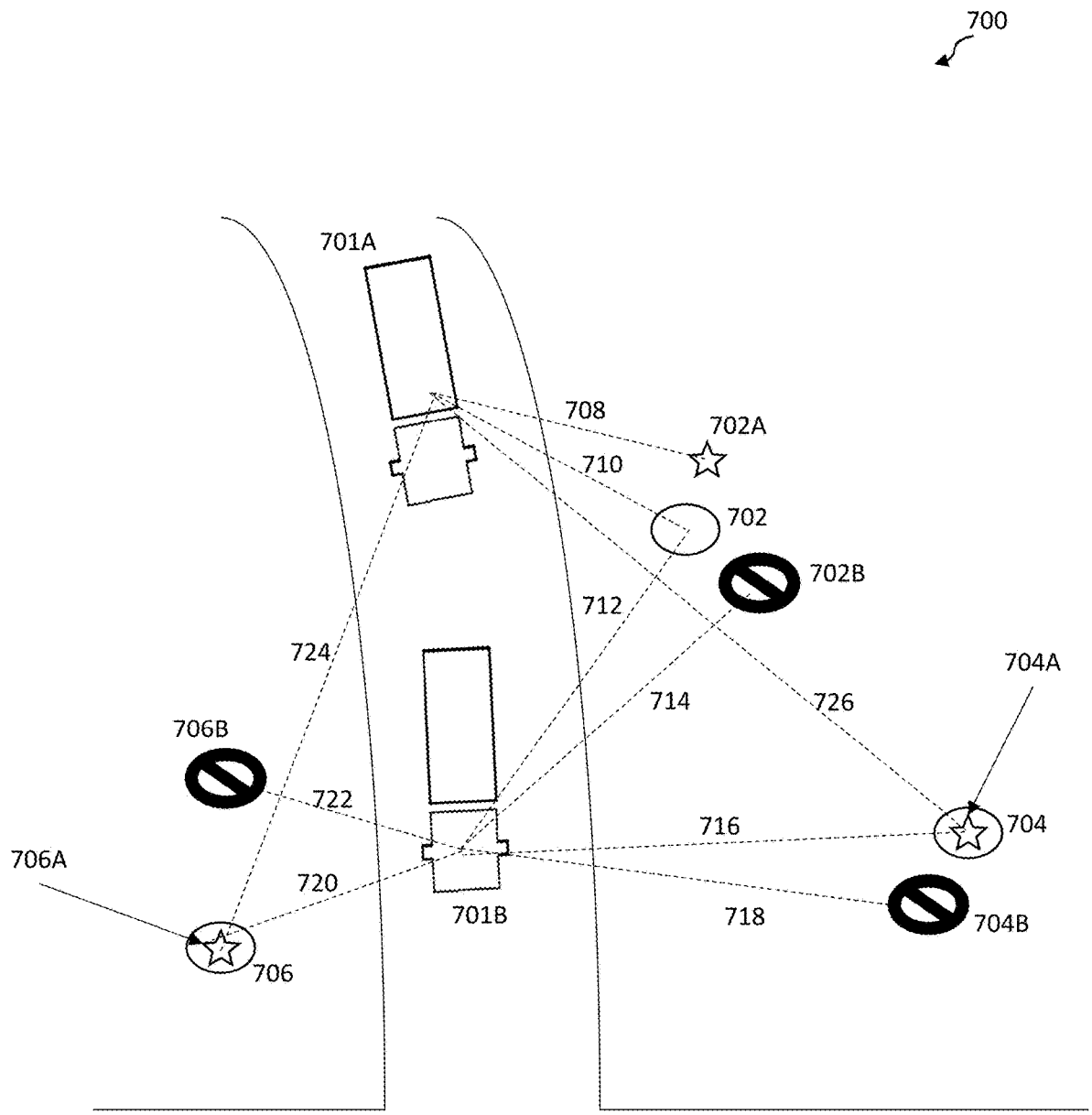
FIG. 7 shows a non-limiting example of localizing an autonomous vehicle, according to an embodiment.

Referring now to FIG. 7, a non-limiting example of the localizing protocol discussed herein is depicted.

In the depicted embodiment, a map 700 has been previously created that uses the methods discussed herein to identify locations of the retroreflective features 702, 704, and 706. As the depicted autonomous vehicle is traveling on the road, the processor may execute a localization protocol in which two simulated locations of 701A and 701B are simulated for the autonomous vehicle. Subsequently, using data collected by sensors of the autonomous vehicle at the locations 701A-B, the processor may determine a distance from each simulated location and the identified retroreflective features 702-706 on the map 700. The distances may then be compared to the actual distance between each simulated location and known location of each retroreflective feature.

For instance, for the simulated location 701A, the processor may determine distance 710 (to the retroreflective feature 702 as it is located within the map 700) and compare the distance 710 with the distance 708, which represents the distance between the location 701A and where the sensors detect the retroreflective feature 702 to be located (location 702A). The discrepancy between the distances 708 and 710 indicate that the autonomous vehicle, at the simulated location 701A, does not correctly detect the location of the retroreflective feature 702 (because it detects the retroreflective feature 702 to be located at the location 702A). In contrast, the processor determines that, at the simulated location 701A, the autonomous vehicle correctly detects the retroreflective features 704 and 706 because the location of the detected retroreflective feature 704A matches the location of the retroreflective feature 704 within the map 700 (as indicated by the distance 726). Similarly, the distance 724 also indicates that the locations of the retroreflective feature 706 and retroreflective feature 706A match. Using the calculated distances, the processor may generate a score for the simulated location 701A.

The processor may also calculate similar distances for the simulated location 701B. However, the processor may determine (using the distance 712 and 714) that the autonomous vehicle has miscalculated the retroreflective feature 702 to be located at the location 702B; retroreflective feature 706 to be located at a location 706B (using the distances 720 and 722); and the retroreflective feature 704 to be located at the location 704B (using distances 716 and 718). Therefore, the score generated for the simulated location 701B is lower than the simulated location 701A. As a result, the processor determines the location of the autonomous vehicle to be the simulated location 701A. In some embodiments, the score may also incorporate location-tracking data received from one or more sensors of the autonomous vehicle (e.g., GPS tracking modules). In some embodiments, the simulated locations discussed herein may be generated based on the location-tracking data received from the autonomous vehicle.

In some embodiments, the simulated location 701A may be transmitted to an autonomous driving module of the autonomous vehicle, such that the autonomous driving module can make appropriate driving decisions and navigate the autonomous vehicle.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
monitoring, by a processor, using a sensor of a first vehicle, data associated with a retroreflective feature near a road being driven by the first vehicle;
collecting, by the processor, using the sensor of the first vehicle, the data associated with the retroreflective feature;
vectorizing, by the processor, the data associated with the retroreflective feature;
generating, by the processor, a digital map including vectorized data associated with the retroreflective feature and a location associated with the retroreflective feature;
receiving, by the processor, data associated with the retroreflective feature from a second vehicle; and
executing, by the processor, a localization protocol to identify a location of the second vehicle using the digital map.

2. The method of claim 1, wherein the location of the second vehicle is identified in accordance with a position and velocity of the second vehicle with respect to the retroreflective feature.

3. The method of claim 1, wherein the location of the second vehicle is further identified by a location-tracking sensor of the second vehicle.

4. The method of claim 1, further comprising:
transmitting, by the processor, the location of the second vehicle to an autonomous driving processor associated with the second vehicle.

5. The method of claim 1, where the sensor of the first vehicle is a LiDAR sensor.

6. The method of claim 5, further comprising:
generating, by the processor, a cuboid representing the retroreflective feature.

7. The method of claim 1, wherein the localization protocol comprises:
- simulating, by the processor, a plurality of locations for the second vehicle; and
- generating, by the processor, a score for each simulated location.

8. A non-transitory machine-readable storage medium having computer-executable instructions stored thereon that, when executed by one or more processors, cause the one or more processors to perform operations comprising:
- monitoring using a sensor of a first vehicle, data associated with a retroreflective feature near a road being driven by the first vehicle;
- collecting, using the sensor of the first vehicle, the data associated with the retroreflective feature;
- vectorizing the data associated with the retroreflective feature;
- generating a digital map including vectorized data associated with the retroreflective feature and a location associated with the retroreflective feature;
- receiving data associated with the retroreflective feature from a second vehicle; and
- executing, by the processor, a localization protocol to identify a location of the second vehicle using the digital map.

9. The non-transitory machine-readable storage medium of claim 8, wherein the location of the second vehicle is identified in accordance with a position and velocity of the second vehicle with respect to the retroreflective feature.

10. The non-transitory machine-readable storage medium of claim 8, wherein the location of the second vehicle is further identified by a location-tracking sensor of the second vehicle.

11. The non-transitory machine-readable storage medium of claim 8, wherein the instructions further cause the one or more processors to:
- transmit the location of the second vehicle to an autonomous driving processor associated with the second vehicle.

12. The non-transitory machine-readable storage medium of claim 8, where the sensor of the first vehicle is a LiDAR sensor.

13. The non-transitory machine-readable storage medium of claim 12, wherein the instructions further cause the one or more processors to:
- generate a cuboid representing the retroreflective feature.

14. The method of claim 1, wherein the localization protocol comprises:
- simulating a plurality of locations for the second vehicle; and
- generating a score for each simulated location.

15. A system comprising a processor configured to:
- monitor using a sensor of a first vehicle, data associated with a retroreflective feature near a road being driven by the first vehicle;
- collect, using the sensor of the first vehicle, the data associated with the retroreflective feature;
- vectorize the data associated with the retroreflective feature;
- generate a digital map including vectorized data associated with the retroreflective feature and a location associated with the retroreflective feature;
- receive data associated with the retroreflective feature from a second vehicle; and
- execute a localization protocol to identify a location of the second vehicle using the digital map.

16. The system of claim 15, wherein the location of the second vehicle is identified in accordance with a position and velocity of the second vehicle with respect to the retroreflective feature.

17. The system of claim 15, wherein the location of the second vehicle is further identified by a location-tracking sensor of the second vehicle.

18. The system of claim 15, wherein the processor is further configured to:
- transmit the location of the second vehicle to an autonomous driving processor associated with the second vehicle.

19. The system of claim 15, where the sensor of the first vehicle is a LiDAR sensor.

20. The system of claim 15, wherein the processor is further configured to:
- generate a cuboid representing the retroreflective feature.

\* \* \* \* \*